United States Patent [19]
Chheda et al.

[11] Patent Number: 5,960,349
[45] Date of Patent: Sep. 28, 1999

[54] ENHANCED CELLULAR LAYOUT FOR CDMA NETWORKS HAVING SIX-SECTORED CELLS

[75] Inventors: Ashvin Chheda, Dallas; Farhad Bassirat, Plano, both of Tex.

[73] Assignee: Northern Telecom, Montreal, Canada

[21] Appl. No.: 08/859,197

[22] Filed: May 20, 1997

[51] Int. Cl.$^6$ .............................. H04M 11/00; H04Q 7/36
[52] U.S. Cl. ............................................ 455/446; 455/447
[58] Field of Search .................................... 455/446, 447, 455/509, 522

[56] References Cited

U.S. PATENT DOCUMENTS

| | | | |
|---|---|---|---|
| 5,073,971 | 12/1991 | Schaeffer | 455/447 |
| 5,365,571 | 11/1994 | Rha et al. | 455/447 |
| 5,483,667 | 1/1996 | Faruque | 455/447 |
| 5,507,034 | 4/1996 | Bodin et al. | 455/447 |
| 5,722,043 | 2/1998 | Rappaport et al. | 455/447 |

*Primary Examiner*—Reinhard J. Eisenzopf
*Assistant Examiner*—Duc Nguyen
*Attorney, Agent, or Firm*—Haynes and Boone, LLP

[57] ABSTRACT

An enhanced cellular layout for cellular networks having six-sectored cells is disclosed. In one embodiment, the cellular layout is implemented by rotating directional antennas located at each cell site of a triangular cellular layout of a six-sectored CDMA network clockwise or counterclockwise by approximately 10.893° or rotating directional antennas located at each cell site of a parallelogram cellular layout of a six-sectored CDMA network clockwise or counterclockwise by approximately 19.107°.

20 Claims, 4 Drawing Sheets

ENHANCED CELLULAR LAYOUT FOR CDMA NETWORKS HAVING SIX-SECTORED CELLS

TECHNICAL FIELD

The invention relates generally to cellular ar layouts for CDMA cellular wireless communication networks and, more particularly, to an enhanced cellular layout for CDMA cellular wireless communicational networks comprising six-sectored cells.

BACKGROUND OF THE INVENTION

In cellular wireless communicational networks, or "cellular networks," a served area is divided into cells. Each cell is further divided into sectors, except in the case of omni-directional cells, in which the entire cell comprises a single sector. Each cell is served by at least one base station located at a cell site typically at the center of the cell. All of the base stations are connected to a message switching center ("MSC") via a base station controller ("BSC") and hardware links. A plurality of mobile units are connected to the MSC by establishing radio links with one or more nearby base stations.

In other cellular telephone technologies, such as time division multiple access ("TDMA"), as a mobile unit travels from one cell to another, the radio link between the mobile unit and the base station serving the first cell has to be broken and then replaced by a radio link between the mobile unit and the base station serving the second cell. In contrast, in a code division multiple access ("CDMA") cellular telephone system, because the same frequency band is used for all cells and sectors, the first link need not be broken before connecting with the second link. As described in greater detail below, this process is referred to as a "soft handoff" or "softer handoff." The CDMA waveform properties that provide processing gain are also used to discriminate between signals that occupy the same frequency band. A mobile unit thus need not switch frequencies when a call is transferred from one cell or sector to another. Additional details regarding the specifics of the CDMA cellular telephone environment are described in TIA/EIA/IS-95-A, *Mobile Station-Base Station Compatibility Standard for Dual-Mode Wideband Spread Spectrum Cellular System* (hereinafter "CDMA Standard"), which is hereby incorporated by reference in its entirety.

In the context of a cellular telephone system, "handoff" is the process of handing over a call from one sector to another when a mobile unit detects that acceptable communication with the other sector is possible. This occurs mainly when the mobile unit nears a sector boundary or the current communication link is weakened by radio frequency ("RlF") shadowing and another potential communication path from another sector is enhanced. In general, handoff consists of three phases. During the first phase, referred to as "handoff initiation," the handoff process is triggered. During the second phase, referred to as "target selection," a determination is made which sectors are candidates for receiving the handoff. During the third and final phase, referred to as "handoff completion," the mobile unit is transferred from the old sector to the new sector.

The term "soft handoff" is commonly used to refer to a handoff in which the mobile unit commences communication with a new base station without interrupting communications with the old base station, i.e., the call is maintained on both base stations. If there are three cells involved in the handoff, the call will be maintained by all three base stations.

A "softer handoff" refers to a handoff in which the call is maintained on one base station for different sectors of the same cell. It will be recognized by those skilled in the art that, for various reasons, softer handoff typically requires less transmit power than soft handoff on both the forward (i.e., base station-to-mobile unit) and reverse (i.e., mobile unit-to-base station) links.

In order to optimize the performance of a CDMA network, a number of factors must be considered. Arguably, the most important of these are network capacity, that is, the number of calls that can be handled by the network at a given time, and drop call probability, that is, the probability that a call will be dropped during active communication, as well as the relevant interaction of the foregoing factors with network resources, such as transmit power, handoff, and others. Clearly, it is desirable to maximize capacity while minimizing drop call probability.

In CDMA, capacity is soft, i.e., the number of users can be increased; however, as the number of users increases, service is degraded. Capacity of a CDMA system can be increased by minimizing handoff and minimizing the average forward link power required to sustain adequate communication between the mobile unit and the base station. Clearly, however, minimization of these parameters typically increases frame error rates ("FERs") and increases the probability of a call being dropped.

There are a number of methods for increasing the capacity of a CDMA network in areas in which there is a high demand for service. For example, an additional channel could be added; however, even assuming that additional frequency is available, which may not always be the case, this solution is an expensive one for the service provider. Alternatively, a large number of small cells could be deployed. This, too, is an expensive solution, as the service provider must purchase the equipment necessary for implementing base stations at each cell site in addition to the real estate on which the base stations are located.

Yet another method of maximizing the capacity of a CDMA network is to maximize the capacity of each cell thereof by increasing the number of sectors comprising that cell. For example, the capacity of an omni-directional (i.e., single-sectored) cell is X calls. In contrast, the capacity of a three-sectored cell is estimated to be approximately 2.6X, while the capacity of a six-sectored cell is estimated to be approximately 4.8X. In heavy traffic areas of a CDMA network, it is often more cost effective to use one or two sectorized cells instead of a number of smaller, omni-directional cells to provide the necessary amount of coverage.

The reverse link capacity of a CDMA cell/sector may be estimated using the following equation:

$$N=(W/R)*(1/(E_b/N_o))*(1/v)*F*G$$

where: N=the number of users per sector;
W=spread spectrum bandwidth;
R=data rate;
$E_b/N_o$=bit energy/noise spectral density;
v=voice duty cycle;
F=frequency reuse factor; and
G=antenna sectorization gain.

As illustrated by the foregoing equation, an important factor to be considered is referred to as the frequency reuse factor. Frequency reuse factor is the ratio of interference from mobile units within a sector to the total interference from all sectors and is calculated using the following equation:

$F = N_{ic}/(N_{ic} + N_{oc})$ where F is the reverse link frequency reuse factor, $N_{ic}$ is the in-cell/sector interference, and $N_{oc}$ is out-of-cell/sector interference. Clearly, as $N_{oc}$ approaches zero, F approaches one; therefore, the goal is to minimize $N_{oc}$, thereby to maximize F.

The capacity of a network can also be increased through the use of directional antennas at the cell sites. A directional antenna reduces the interference seen at the base station because it only receives in the direction of the antenna. In fact, if there were no side- or back-lobes in the directional antenna, the total interference observed by a sector from other sectors would be reduced by a third. Clearly, sectorization through use of directional antennas increases the number of users, it reduces the frequency reuse factor because of the side- and back-lobes of a directional antenna. Hence, as F is marginally reduced during sectorization, G is increased, translating into an overall increase in capacity. Other factors that play an important role in reducing the frequency reuse factor of a network include a uniform, as opposed to haphazard, cellular layout, antenna beamwidth, side- and back-lobe leakage, and whether the antennas are uniform (i.e., all 60° as opposed to some 60° and some 90°).

FIG. 1 illustrates a three-sectored cell embodiment of a CDMA network. In FIG. 1, inter-cell boundaries are represented by solid lines, while inter-sector boundaries are represented by dashed lines. Sectors are represented in FIG. 1 by unit hexagons. Table I below sets forth estimates of the frequency reuse factor and frequency reuse factor ratio for a three-sectored cell embodiment of a CDMA network as shown in FIG. 1 for various antenna beamwidths, where "frequency reuse factor ratio" is calculated by dividing the frequency reuse factor of the illustrated embodiment by that of a CDMA network comprising omni-directional cells (typically 0.62):

TABLE I

| Antenna 3 dB Beamwidth | Frequency Reuse Factor | Frequency Reuse Factor Ratio |
| --- | --- | --- |
| 60 | 0.604 | 0.974 |
| 70 | 0.591 | 0.953 |
| 80 | 0.573 | 0.924 |
| 90 | 0.556 | 0.897 |
| 100 | 0.536 | 0.865 |
| 110 | 0.515 | 0.831 |
| 120 | 0.492 | 0.794 |

The sectorization of cells into six sectors is well known and at present, there are at least two known cellular layouts for six-sectored cells, including a parallelogram cellular layout, as shown in FIG. 2, and a much less common triangular cellular layout, as shown in FIG. 3. As in FIG. 1, in FIGS. 2 and 3, inter-cell boundaries are represented by solid lines, while inter-sector boundaries are represented by dashed lines.

Table II below sets forth estimates of the frequency reuse factor and frequency reuse factor ratio for a parallelogram cellular layout of a six-sectored cell embodiment of a CDMA network as shown in FIG. 2 for various antenna beamwidths, where "frequency reuse factor ratio" is calculated by dividing the frequency reuse factor of the illustrated embodiment by that of a CDMA network comprising omni-directional cells (typically 0.62):

TABLE II

| Antenna 3 dB Beamwidth | Frequency Reuse Factor | Frequency Reuse Factor Ratio |
| --- | --- | --- |
| 30 | 0.550 | 0.887 |
| 40 | 0.523 | 0.844 |
| 50 | 0.481 | 0.776 |
| 60 | 0.442 | 0.713 |

Finally, Table III below sets forth estimates of the frequency reuse factor and frequency reuse factor ratio for a triangular cellular layout of a six-sectored cell embodiment of a CDMA network as shown in FIG. 3 for various antenna beamwidths, where "frequency reuse factor ratio" is calculated by dividing the frequency reuse factor of the illustrated embodiment by that of a CDMA network comprising omni-directional cells (typically 0.62):

TABLE III

| Antenna 3 dB Beamwidth | Frequency Reuse Factor | Frequency Reuse Factor Ratio |
| --- | --- | --- |
| 30 | 0.565 | 0.911 |
| 40 | 0.539 | 0.869 |
| 50 | 0.499 | 0.805 |
| 60 | 0.456 | 0.735 |

As can be seen with reference to Tables II and III above, the manner in which sectors are laid out affects the frequency reuse factor of a CDMA network, thereby ultimately affecting its capacity. For example, for an antenna beamwidth of 30°, the frequency reuse factor and frequency reuse factor ration for a sector in the CDMA network shown in FIG. 2 are, respectively, 0.550 and 0.887, while the same parameters for a sector in the CDMA network shown in FIG. 3 are, respectively, 0.565 and 0.911. In terms of frequency reuse factor and capacity, the triangular cellular layout is more optimal than the parallelogram cellular layout.

Referring to FIG. 2, in the parallelogram cellular layout, it will be recognized that each point X is equidistant from three base stations; therefore, it is highly likely that at each point X, there will be no single dominant sector. Instead, there will be six sectors of approximately equal strength (or weakness) and a mobile unit located at a point X will necessarily be in a higher (e.g., four-, five-, or six-way) handoff state. Due to the lack of a single dominant sector, the strengths of each sector are lower; consequentially, performance is degraded. In FIG. 3, in the triangular cellular layout, at each point Y there are four sectors of approximately equal strength. This is an improvement over the parallelogram cellular layout, but still not optimal.

It will be recognized by those skilled in the art that forward link capacity of a CDMA network is directly affected by handoff state, in that a higher handoff state consumes greater resources. In addition, higher handoff states are due to higher out-of-cell signal power, which means that if there is excessive signal interference on the forward link, then capacity is sacrificed and greater forward link transmit power is required to sustain communications between the mobile unit and the base station.

As used herein, unless otherwise specifically designated as "forward link" or "reverse link," "capacity" refers to the overall capacity (i.e., number of calls that can be serviced at one time) of a network.

Other parameters that are desirable to optimize are the average forward link and reverse link transmit powers required per user, as well as the forward link and reverse link frame error rates ("FERs"), all of which are affected by interference and can be improved by reducing the interference seen by a call.

As evidenced by the above, the particular arrangement of the sectors within a six-sectored cell CDMA network will affect the performance of the network.

Accordingly, what is needed is an improved cellular layout for CDMA networks having six-sectored cells that optimizes the capacity of the CDMA network.

SUMMARY OF THE INVENTION

The present invention, accordingly, provides a system and method for optimizing the capacity of a CDMA network. In a preferred embodiment, an enhanced cellular layout for six-sectored CDMA networks is accomplished either by rotating directional antennas located at each cell site of a triangular cellular layout of a six-sectored CDMA network (FIG. 3) clockwise or counterclockwise by approximately $10.8930°±3°$ or by rotating directional antennas located at each cell site of a parallelogram cellular layout of a six-sectored CDMA network (FIG. 2) clockwise or counterclockwise by approximately $19.107°±3°$.

It has been determined that the enhanced cellular layout for six-sectored CDMA networks results in several advantages over prior art six-sector cellular layouts. In particular, comparing the enhanced cellular layout of the present invention with prior art cellular layouts under similar conditions, e.g., cell sites separated by the same distance, equal base station maximum power outputs, and equal RF conditions, the enhanced cellular layout of the present invention results in an increased frequency reuse factor, increased capacity and reduced drop call probability. The reduction in call drop probability is mainly due to the ease with which the mobile unit can go in and out of handoff. Additional benefits include a reduction in the average forward link and reverse link transmit power required per user and a reduction in the forward link and reverse link frame error rates ("FERs").

Perhaps one of the most important features of the enhanced cellular layout of the present invention is that the average power requirement by a mobile unit to sustain adequate communication will be smaller, as no two sectors are directly facing each other; consequently the average level of interference is less, thereby increasing the frequency reuse factor of the network.

A technical advantage achieved with the present invention is that it increases the frequency reuse factor and capacity and reduces the call drop probability of a six-sectored CDMA network.

Another technical advantage achieved with the present invention is that it reduces the average power required by a mobile unit to sustain adequate communication by ensuring that no two sectors are directly facing each other, thereby reducing the average level of interference.

Another technical advantage achieved with the present invention is that it results in more users being able to use the network and increases the reliability of the network.

Still another technical advantage achieved with the present invention is that there is a better balance among two- and three-way soft and softer handoff than with other cellular layouts.

Still another technical advantage achieved with the present invention is that it decreases the time that a mobile unit is in a higher (e.g., four-way, five-way, and six-way) handoff state.

Still another technical advantage achieved with the present invention is that it results in improvements to average forward link and reverse link transmit power, as well as forward link and reverse link FERs.

DESCRIPTION OF THE PREFERRED EMBODIMENT

Figure 1:
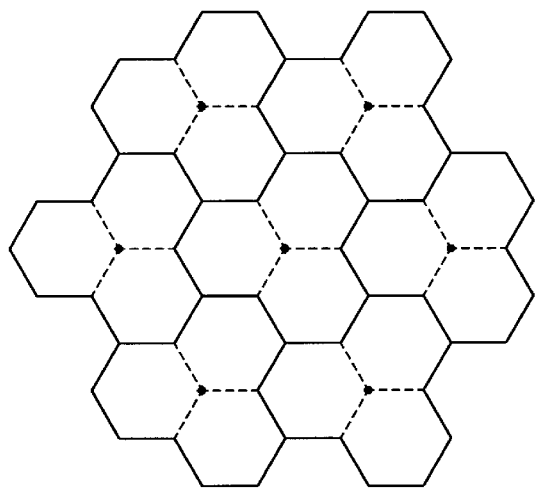
FIG. 1 illustrates a CDMA network comprising three-sectored cells.
Figure 2:
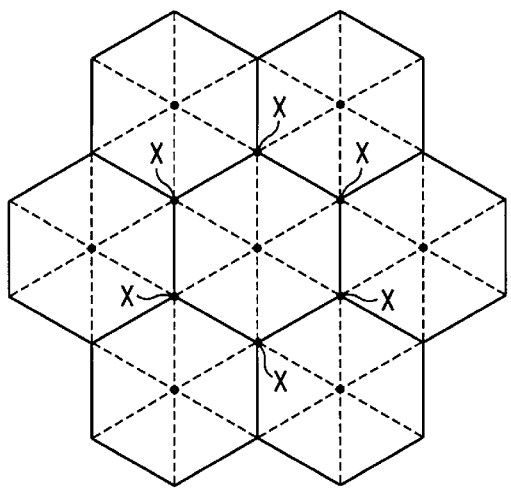
FIG. 2 illustrates a parallelogram cellular layout of a six-sectored cell embodiment of a CDMA network.
Figure 3:
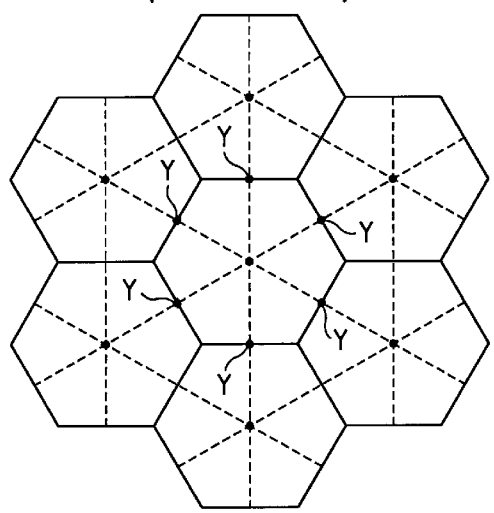
FIG. 3 illustrates a triangular cellular layout of a six-sectored cell embodiment of a CDMA network.

FIG. 1 illustrates a CDMA network comprising three-sectored cells, as described above. FIG. 2 illustrates a parallelogram cellular layout of a six-sectored cell embodiment of a CDMA network, as described above. FIG. 3 illustrates a triangular cellular layout of a six-sectored cell embodiment of a CDMA network, as described above.

Figure 4:
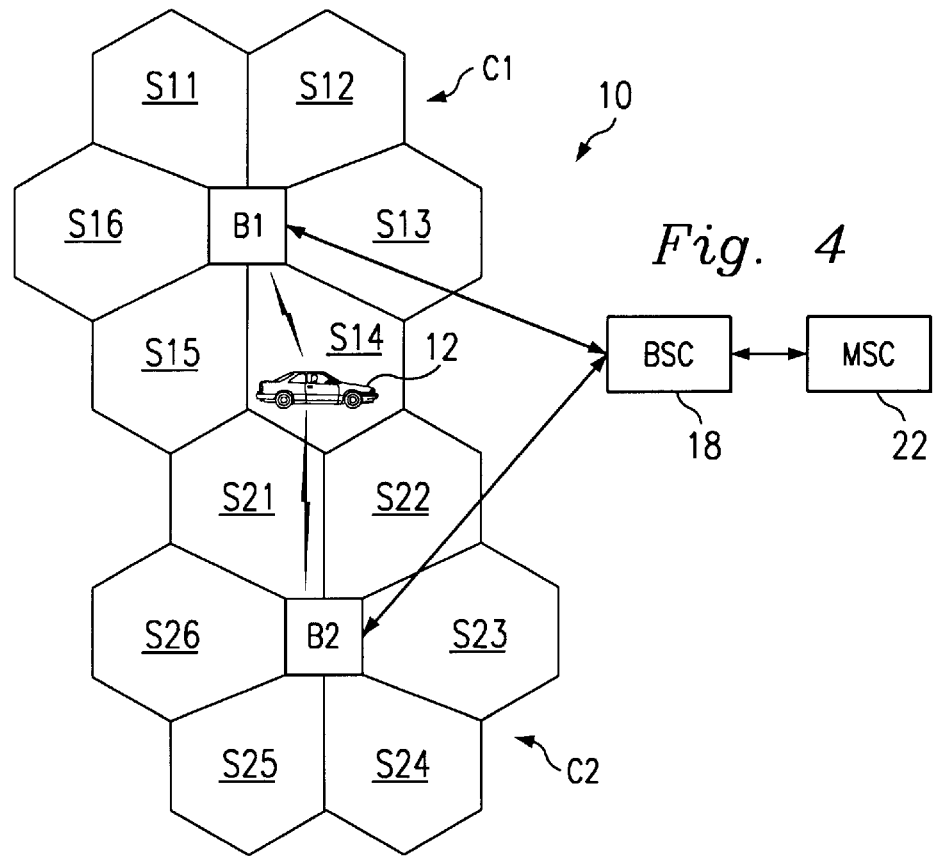
FIG. 4 is a system block diagram of a CDMA network embodying features of the present invention.

In FIG. 4, a CDMA network is designated generally by a reference numeral 10. In a preferred embodiment, the system 10 is comprised of a plurality of cells, represented in FIG. 4 by cells C1 and C2. In accordance with features of the present invention, each of the cells C1, C2, is divided into six sectors, S11–S16, and S21–S26, respectively, as described in greater detail with reference to FIG. 5, through use of a directional antennas at the cell site of each cell C1, C2. Each cell C1, C2, comprises a base station B1, B2, including at least six directional antennas, respectively, located at a cell site thereof, the primary function of which is to provide over-the-air radio frequency ("RF") communication with mobile units, such as a mobile unit 12.

Each base station B1, B2, is further connected via a link to a base station controller ("BSC") 18, which is connected to a mobile switching center ("MSC") 22. As the elements comprising the system 10, as well as the configuration thereof, are well known in the art, the details thereof will not be further described, except as necessary to impart a complete understanding of the present invention.

Figure 5:
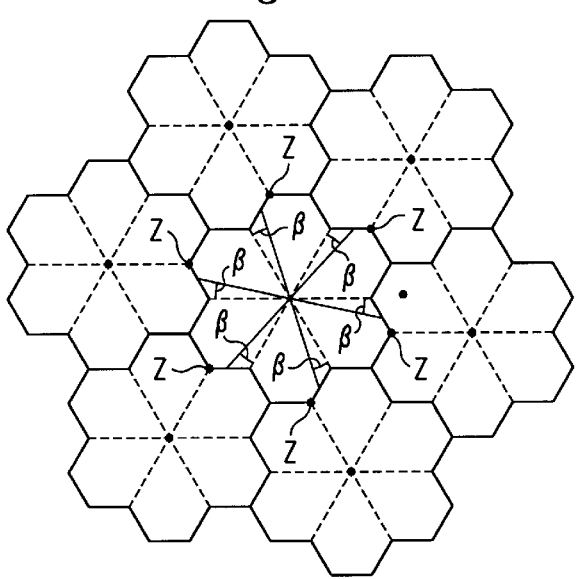
FIG. 5 illustrates an enhanced cellular layout of a six-sectored cell embodiment of a CDMA network in accordance with features of the present invention.

FIG. 5 illustrates an enhanced cellular layout of a six-sectored cell embodiment of a CDMA network in accordance with features of the present invention. As in FIGS. 1, 2, and 3, in FIG. 5, inter-cell boundaries are represented by solid lines, while inter-sector boundaries are represented by dashed lines. As will be described in greater detail below, the cellular layout shown in FIG. 5 is best accomplished either by rotating each directional antenna of a triangular cellular layout of a six-sectored CDMA network (FIG. 3) clockwise or counterclockwise by approximately $10.893°±3°$ or by rotating each directional antenna of a typical parallelogram cellular layout of a six-sectored CDMA network (FIG. 2) clockwise or counterclockwise by approximately $19.107°±3°$.

Figure 6:
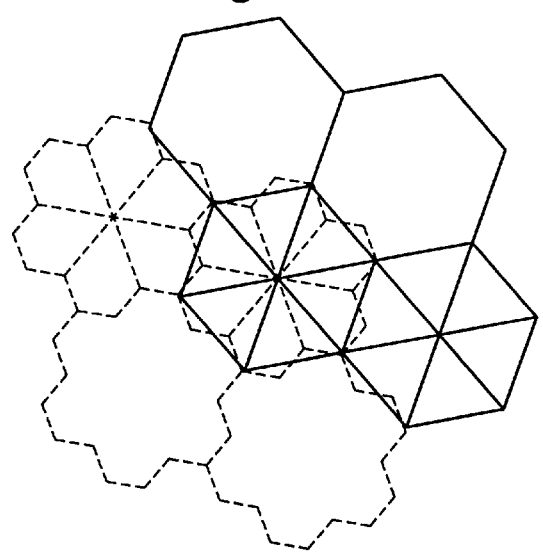
FIG. 6 illustrates a direct comparison of the cellular layouts shown in FIGS. 2 and 5.

FIG. 6 illustrates a direct comparison of the cellular layouts of FIGS. 2 and 5. In FIG. 6, cells oriented according to the enhanced cellular layout shown in FIG. 5, including inter-sector boundaries thereof, are represented by dashed lines, while cells oriented according to the parallelogram cellular layout shown in FIG. 2, including inter-sector boundaries thereof, are represented by solid lines.

Figure 7:
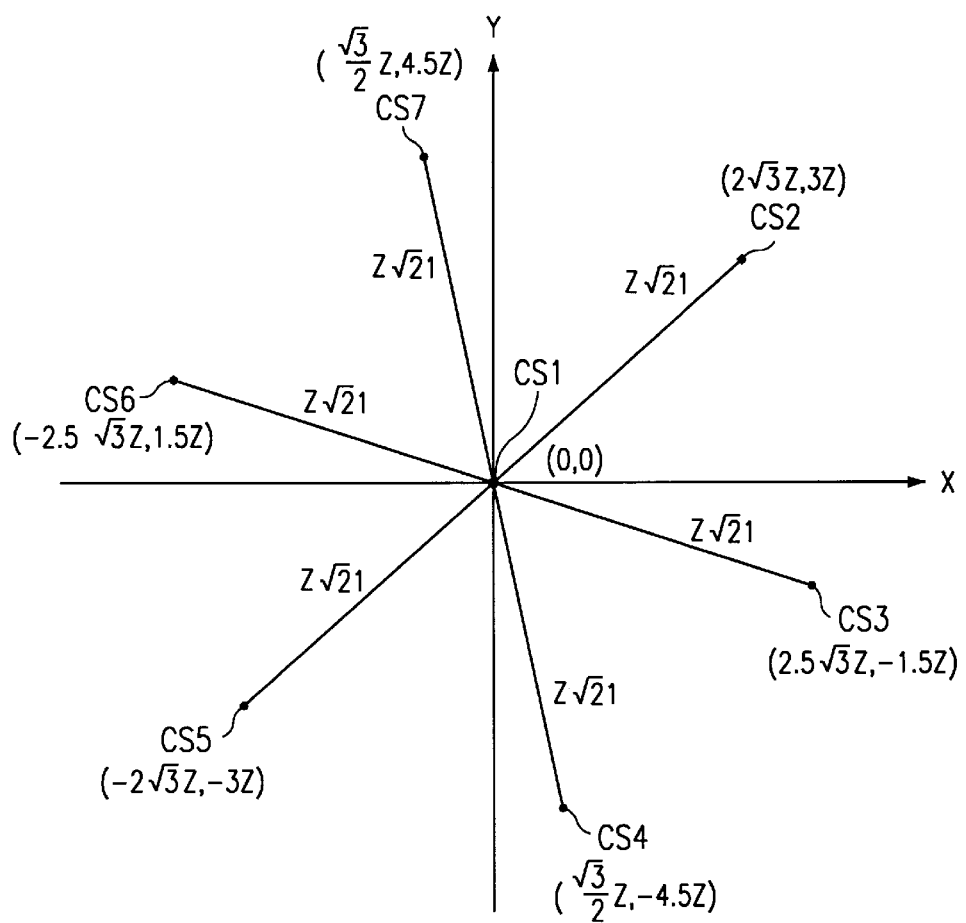
FIG. 7 illustrates the relative placement of cell sites in a typical CDMA network.
Figure 8:
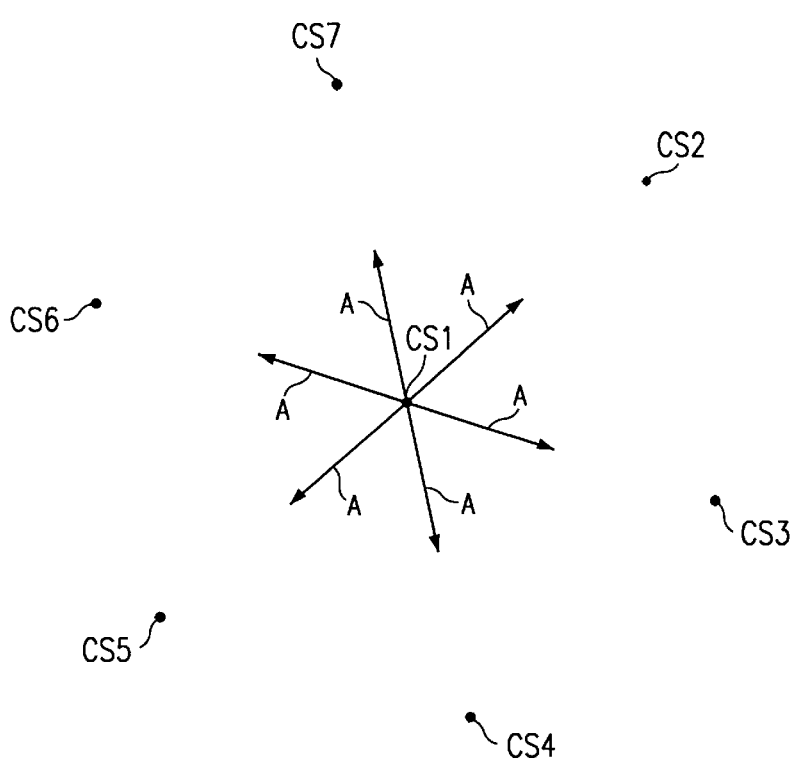
FIG. 8 illustrates antenna directivity for the cellular layout shown in FIG. 2.
Figure 9:
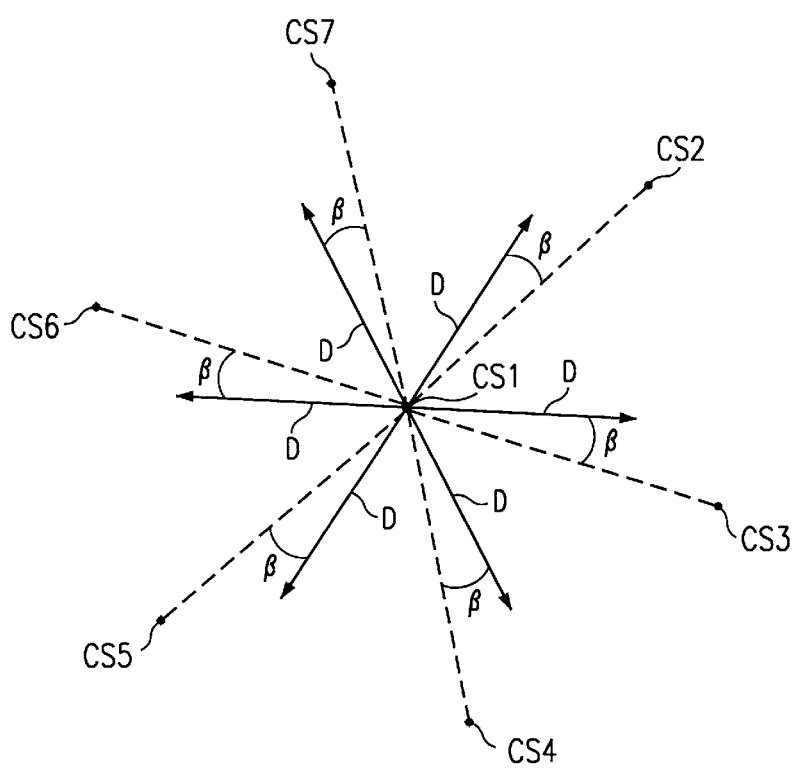
FIG. 9 illustrates antenna directivity for the cellular layout shown in FIG. 5.

Referring now to FIGS. 7–9, the enhanced cellular layout of the present invention will be further described. FIG. 7 illustrates relative placement of cell sites and corresponding directional antennas in a typical CDMA network. Referring now to FIG. 7, a conventional cell site layout will be described with reference to a cell site CS1, which is defined as the origin (0, 0) of an x, y plane. Six cell sites, CS2–CS7, are positioned around the cell site CS1 at the following coordinate pairs:

$$(2\sqrt{3}z, 3z), (2.5\sqrt{3}z, -1.5z), ((\sqrt{3}/2)z, -4.5z),$$
$$(-2\sqrt{3}z, -3z), (-2.5\sqrt{3}z, 1.5z), (-(\sqrt{3}/2)z, 4.5z)$$

respectively, where z is equal to one unit of distance and the distance between cell site CS1 and any of the other cell sites CS2–CS7, respectively, is:

$$z\sqrt{21}$$

it being recognized that at least six directional antennas are located at each cell site CS1–CS7 to create six sectors.

Referring now to FIG. 8, it will be recognized by those skilled in the art that the parallelogram cellular layout shown in FIG. 2 is accomplished as follows. For each cell site, such as the cell site CS1, the directional antennas thereof are directed toward each of six surrounding cell sites CS2–CS7, as represented in FIG. 8 by arrows labeled A. Accordingly, each cell site has antennas directed to each of its six neighboring cell sites and has antennas from six different cell sites directed toward it.

FIG. 9 illustrates antenna directivity for the enhanced cellular layout of the present invention. As shown in FIG. 9, rather than being directed directly toward the neighboring cell sites CS2–CS7, as shown in FIG. 8, the antennas of the cell site CS1 are directed such that they make an angle β with an imaginary line between the cell site CS1 and each of the cell sites CS2–CS7, as represented in FIG. 9 by arrows labeled D. Analysis and simulations have shown that the ideal value of β is 19.107°, although as a practical matter, it would be desirable to position the antennas within±3° of that value.

Table IV below sets forth estimates of the frequency reuse factor and frequency reuse factor ratio for the enhanced cellular layout of a six-sectored cell embodiment of a CDMA network as shown in FIG. 5 for various antenna beamwidths, where "frequency reuse factor ratio" is calculated by dividing the frequency reuse factor of the illustrated embodiment by that of a CDMA network comprising omni-directional cells (typically 0.62):

TABLE IV

| Antenna 3 dB Beamwidth | Frequency Reuse Factor | Frequency Reuse Factor Ratio |
| --- | --- | --- |
| 30 | 0.580 | 0.935 |
| 40 | 0.545 | 0.879 |

TABLE IV-continued

| Antenna 3 dB Beamwidth | Frequency Reuse Factor | Frequency Reuse Factor Ratio |
| --- | --- | --- |
| 50 | 0.500 | 0.806 |
| 60 | 0.453 | 0.731 |

Comparing the performance of the enhanced cellular layout, as shown in Table IV, with that of the parallelogram and triangular cellular layouts, as shown in Tables II and III above, respectively, it will be recognized that the enhanced cellular layout results in a better frequency reuse factor and frequency reuse factor ratio, and thus, higher capacity, than either of the other cellular layouts. For example, for an antenna beamwidth of 30°, the frequency reuse factor for a sector in a CDMA network employing the enhanced cellular layout is 0.580, as compared to 0.550 for a sector in a CDMA network employing a parallelogram cellular layout and 0.565 for a sector in a CDMA network employing a triangular cellular layout. Similarly, for the same antenna beamwidth, the capacity of a sector in a CDMA network is than that of a CDMA network employing either the parallelogram cellular layout or the triangular cellular layout due to several factors, including: (1) a higher frequency reuse factor; (2) better handoff distribution; (3) improved forward link performance; and (4) improved reverse link performance.

Referring to FIG. 2, in the parallelogram cellular layout, it will be recognized that each point X is equidistant from three base stations; therefore, it is highly likely that at each point X, there will be no single dominant sector. Instead, there will be six sectors of approximately equal strength (or weakness) and a mobile unit located at a point X will necessarily be in a higher (e.g., four-, five-, or six-way) handoff state. Due to the lack of a single dominant sector, the strengths of each sector are lower; consequentially, performance is degraded. In FIG. 3, in the triangular cellular layout, at each point Y there are four sectors of approximately equal strength. This is an improvement over the parallelogram cellular layout, but still not optimal.

Referring now to FIG. 5, it will be noted that in the enhanced cellular layout, due to its unique structure, points similar to points X and Y exist; however, at each point Z, there are only three sectors of comparable strength, rather than six (parallelogram cellular layout) or four (triangular cellular layout). Therefore, the state of handoff is lower (i.e., two- or three-way as compared to four-, five-, or six-way), meaning more resources are available at each point Z than at points X or Y, and the strength of each of the three equal sectors is low, but not so low as to degrade performance.

As previously noted, avoiding higher handoff states in important because higher handoff states consume greater resources and result in reduced forward link capacity. In addition, the reduction in interference enabled by the enhanced cellular layout reduces the forward link transmit power required to sustain communications between a mobile unit and a base station.

Clearly, on all counts (frequency reuse factor, capacity, and handoff state) the enhanced cellular layout is superior to either the parallelogram cellular layout or the triangular cellular layout.

For example, the average forward link transmit power required per user for the enhanced cellular layout under certain conditions, i.e., speed of 72 km/hour, rayleigh fading, 1 multipath per sector, has been estimated to be approximately 7.5% of total available power. In contrast, average forward link transmit power required per user for the parallelogram cellular layout under similar conditions has been estimated to be approximately 8.0% of total available power. Moreover, under identical conditions, the forward link FER for the enhanced cellular layout has been estimated to be approximately 1% with power control employed to restrict FER to 1%. In contrast, under identical conditions, the forward link FER for the enhanced cellular layout has been estimated to be approximately 1.5% with power control employed to restrict FER to 1%.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A code division multiple access ("CDMA") network comprising a plurality of six-sectored cells each having at least one directional antenna located at a cell site thereof, wherein for each of said six-sectored cells, each said at least one directional antenna thereof is oriented such that a line bisecting a corresponding one of said sectors of said six-sectored cell forms an angle β with a line between said cell site of said six-sectored cell and said cell site of an adjacent one of said six-sectored cells, wherein said angle β is selected from a range of angles consisting of 19.107°±3°.

2. The CDMA network of claim 1 wherein said cell site comprises at least six directional antennas.

3. A code division multiple access ("CDMA") network comprising a plurality of six-sectored cells each having at least one directional antenna, said CDMA network created by rotating each said directional antenna an amount β with reference to a corresponding antenna oriented for creating a parallelogram CDMA network cellular layout, wherein β is selected from a range of angles consisting of 19.107°±3°.

4. The CDMA network of claim 3 wherein said rotating is performed in a clockwise direction.

5. The CDMA network of claim 3 wherein said rotating is performed in a counterclockwise direction.

6. The CDMA network of claim 3 wherein said at least one directional antenna comprises at least six directional antennas.

7. A code division multiple access ("CDMA") network comprising a plurality of six-sectored cells each having at least one directional antenna, said CDMA network created by rotating each said directional antenna an amount β with reference to a corresponding antenna oriented for creating a triangular CDMA network cellular layout, wherein β is selected from a range of angles consisting of 10.8930°±3°.

8. The CDMA network of claim 7 wherein said rotating is performed in a clockwise direction.

9. The CDMA network of claim 7 wherein said rotating is performed in a counterclockwise direction.

10. The CDMA network of claim 7 wherein said at least one directional antenna comprises at least six directional antennas.

11. A method of improving performance of a cellular communication network comprising at least one cell:

providing at least six directional antennas at each cell site;

orienting each said directional antenna such that a cellular layout of said cellular communication network is a parallelogram cellular layout; and rotating each said directional antenna at each cell site in a first direction a first predetermined amount;

wherein said first predetermined amount is selected from a range of angles consisting of 19.1070°±3°.

12. The method of claim 11 wherein said first direction is clockwise.

13. The method of claim 11 wherein said first direction is counterclockwise.

14. The method of claim 11 wherein said cellular communication network is a code division multiple access ("CDMA") network.

15. The method of claim 11 wherein each said at least one cell comprises six sectors.

16. A method of improving performance of a cellular communication network comprising at least one cell:

providing at least six directional antennas at each cell site;

orienting each said directional antenna such that a cellular layout of said cellular communication network is a triangular cellular layout; and rotating each said directional antenna at each cell site in a first direction a first predetermined amount;

wherein said first predetermined amount is selected from a range of angles consisting of 10.893°±3°.

17. The method of claim 16 wherein said first direction is clockwise.

18. The method of claim 16 wherein said first direction is counterclockwise.

19. The method of claim 16 wherein said cellular communication network is a code division multiple access ("CDMA") network.

20. The method of claim 16 wherein each said at least one cell comprises six sectors.

* * * * *